Patented Jan. 9, 1951

2,537,941

UNITED STATES PATENT OFFICE 2,537,941

RECOVERY OF STREPTOMYCIN

Peter P. Regna, West New York, N. J., and Isaiah A. Solomons, Jackson Heights, N. Y., assignors to Chas. Pfizer & Co., Inc., Brooklyn, N. Y., a corporation of New Jersey No Drawing. Application June 4, 1946, Serial No. 674,394

8 Claims. (Cl. 260—210)

This invention relates to the recovery and purification of streptomycin and it has for its object to provide a novel and improved process for this purpose.

Another object of the invention is to separate streptomycin salts of high antibiotic activity from complex mixtures containing materials of different antibacterial spectra.

Still another object is to provide an efficient and economical method of precipitating streptomycin from aqueous solutions such as fermentation broths and for recovering both the streptomycin and the precipitating agent in almost quantitative yields.

Various other objects and advantages will be apparent as the nature of the invention is more fully disclosed.

Streptomycin, an antibiotic produced by fermentation from selected strains of cultures of *Streptomyces griseus*, is a highly potent antibacterial agent which is effective against a wide variety of pathogenic organisms. Clinical indications for the use of streptomycin have been observed in urinary tract infections, due to gram negative microorganisms, influenza bacillus meningitis, tracheobronchitis and pneumonia, tularemia, opththalmic infections due to *Ps. pyocyaneous*, peritonitis, due to gram negative organisms, and certain gram negative bacillary infections. Promising results have been obtained also in studies of tuberculosis.

It is known to adsorb streptomycin or its salts from solutions upon activated carbon, and to elute it therefrom with solvents adjusted to a pH below neutral, but this procedure yields streptomycin along with much extraneous material since many other substances are simultaneously adsorbed and eluted. For this reason this method gives a product of low potency. It is also possible to prepare streptomycin concentrates by adsorption on zeolite or ion-exchange resins. However, in removing the streptomycin from these adsorbents by sodium or potassium chlorides, the streptomycin becomes contaminated with considerable amounts of these salts which are difficult to remove, and even after separation of the inorganic salts gives concentrates with a low streptomycin potency.

We have now discovered that streptomycin is almost quantitatively precipitated, in the form of a streptomycin silicotungstate complex, by the addition of silicotungstic acid or its water-soluble salts to the broth. We have also discovered how to recover the streptomycin from this complex. The present methods of breaking up known tungsten complexes formed with amino acids are not applicable. Such methods require strong alkaline solutions in which streptomycin would be rapidly destroyed.

The precipitation with silicotungstic acid is not entirely specific for streptomycin; other bases formed in the fermentation, and which may likewise have antibiotic activity, are also precipitated. However, the streptomycin concentrate obtained after the decomposition of the complex is of vastly improved potency and is not contaminated with objectionable toxic substances contained in the original fermentation broth so that the material obtained by this process can be satisfactorily used for clinical purposes.

According to our process, the decomposition of the complex depends upon the difference in solubility in a solvent, of streptomycin silicotungstate and triethylamine silicotungstate. We have found that methyl alcohol is the most satisfactory solvent, since in it triethylamine silicotungstate is extremely insoluble. However, other alcohols such as ethanol, isopropanol and butanol can be used but they are less adaptable because of the lower solubility of streptomycin hydrochloride in these last mentioned solvents. The preferred method to accomplish the metathesis reaction is to suspend the streptomycin silicotungstate in a solution of methanol containing triethylamine hydrochloride, to precipitate the triethylamine silicotungstate and to leave in solution the soluble streptomycin hydrochloride of improved potency. Instead of triethylamine hydrochloride, other triethylamine hydrohalides such as the corresponding hydrobromide or hydroiodide may be used. A great number of other soluble amine-hydrochlorides can be employed in the decomposition; the only condition being that the amine-silicotungstate is insoluble in alcohol and that the amine-sulfate is soluble. These conditions are realized by a number of amines, such as: dimethyl aniline, diethylaniline, ethylene diamine, hexamethylene tetramine, quinoline, pyridine, ethanolamine, monoethylamine, etc.

The alcoholic solution of streptomycin hydrochloride, free of silicotungstic acid, is treated with triethylamine sulfate, or an appropriate amine sulfate, and the streptomycin sulfate precipitate is readily recovered by filtration. Other amine sulfates meeting the conditions specified above can be substituted for triethylamine sulfate. Furthermore, other amine salts such as amine phosphates, amine sulfonates, oxalates or other organic and inorganic acids resulting in the corresponding alcohol insoluble streptomycin salt can be used.

The silicotungstic acid, in the amine silicotungstate complex, obtained in the metathesis reaction of streptomycin silicotungstate can be recovered for re-use by the addition of sulfuric acid and extraction of the silicotungstate by an organic solvent.

We have also discovered that a similar metathesis reaction can be achieved with the phosphomolybdate precipitate obtained by the addition of phosphomolybdic acid to a fermentation broth.

Example 1

One liter of streptomycin fermentation broth 60 γ/ml. was treated with 6 grams of silicotungstic acid. The streptomycin present precipitated immediately as the silicotungstate, in very minute crystals which required the use of a filter-aid for successful filtration. The precipitate was washed with water and finally with methanol and then it was suspended in methyl alcohol containing 10% triethylamine hydrochloride adjusted to pH 8 (determined by diluting a portion with an equal volume of water). This suspension was shaken for 2–3 hours to promote metathesis with the rather insoluble streptomycin silicotungstate and formation of the even more insoluble triethylamine silicotungstate. The progress of the reaction was ascertained by taking periodic samples of the clear supernatant liquid for biological assays.

When the maximum amount of streptomycin was obtained in methyl alcohol solution the triethylamine silicotungstate was filtered and the filtrate containing streptomycin hydrochloride was treated with a methyl alcohol solution containing 10% triethylamine sulfate. The precipitated streptomycin sulfate was filtered and dried. It had a potency of 150 γ/mg., contained no silicotungstic acid and had a satisfactory toxicity level against mice.

Example 2

Solid streptomycin hydrochloride concentrate of 70 γ/mg. obtained by the carbon adsorption and elution method was dissolved in water to a concentration of 1500 γ/ml. and adjusted to pH 3.5. While a substantial precipitate will form by the addition of silicotungstic acid even at pH 6, the reaction is more complete at pH 3.5. To the aqueous streptomycin solution silicotungstic acid in proportion of one gram for each 50,000 γ was added slowly with stirring. The resulting precipitate was filtered, dissolved in a 1–1 mixture of acetone-water in the proportion of 25 ml. of the solvent mixture for each 100,000 γ of streptomycin. To this was added a methanol solution containing 10% triethylamine hydrochloride adjusted to pH 8. Precipitation of the triethylamine silicotungstate occurred without delay. After adding one volume of methanol, the solution was filtered to remove the triethylamine silico-tungstate, then enough methanol added to make a concentration of 80% methanol and this was treated directly with the calculated amount of triethylamine sulfate adjusted to pH 6.4. The dried streptomycin sulfate had a potency of 220 γ/mg.

Another streptomycin concentrate 100 γ/mg. was treated in the same way. Its potency was increased to 320 γ/mg.

Example 3

Three and one-half liters of streptomycin fermentation broth (125 γ/ml.) was adjusted to pH 3.5 with dilute hydrochloric acid, and treated with 35 grams of silicotungstic acid with stirring. The precipitate was filtered over a filter-cel pad. A biological test on the filtrate, after removing the excess silicotungstic acid, as barium silicotungstate showed that only 8% of streptomycin remained unprecipitated.

The streptomycin silicotungstate precipitate was washed further with anhydrous methanol and then suspended in 250 ml. of anhydrous methyl alcohol containing 7% triethylamine hydrochloride. After the mixture was shaken for 24 hours, it was found by test that about 80% of the complex streptomycin silicotungstate had been converted to streptomycin hydrochloride and triethylamine silicotungstate. The latter was removed by filtration and the alcoholic filtrate was treated with a methanol solution containing 10% triethylamine sulfate. The precipitated streptomycin sulfate was filtered and the filtrate was treated with two volumes of acetone to complete the precipitation of streptomycin sulfate.

Example 4

3.5 liters of streptomycin fermentation broth was adjusted to pH 3.5 with dilute hydrochloric acid, and treated with 55 grams of phosphomolybdic acid ($20MoO_3.2.H_3PO_4.48H_2O$.) with stirring and the precipitate was filtered. In order to test the filtrate for the remaining activity, a portion was treated with an exact amount of lead acetate to remove the phosphomolybdic acid. After filtration it was neutralized with sodium hydroxide and assayed against B. subtilis. This showed that 91% of the streptomycin had precipitated with phosphomolybdic acid.

The streptomycin phosphomolybdate complex after washing with anhydrous methanol was treated with 225 ml. of anhydrous methanol containing 7% triethylamine hydrochloride and shaken 6 hours. A test showed that 50% of the streptomycin phosphomolybdate complex had been converted to streptomycin hydrochloride and triethylamine phosphomolybdate. This was filtered, the filtrate was allowed to stand. After refiltering, it was treated in the previously described manner with triethylamine sulfate. A further crop of streptomycin sulfate was obtained by treating the filtrate with acetone.

Example 5

A solution of streptomycin hydrochloride in methanol containing 174,000 γ (E. coli assay) obtained by the decomposition of a silicotungstate complex was treated with a solution of methanol containing 10% ethanolamine phosphate pH 7.0 (determined by diluting a portion of the alcoholic solution with 3 volumes of water) until no further precipitation took place. The streptomycin phosphate was filtered, washed with methanol and dried. The precipitate contained 154,000 γ of streptomycin and had a potency of 380 γ/mg. (E. coli).

Example 6

A solution of streptomycin hydrochloride in methanol containing 174,000 γ (E. coli assay) obtained by the decomposition of a silicotungstate complex was treated with a solution of methanol containing 10% morpholine sulfate pH 7.0 (determined by diluting a portion of the alcoholic solution with 3 volumes of water) until no further precipitation took place. The streptomycin sulfate was filtered, washed with methanol and dried. The precipitate contained 164,000 γ of streptomycin and had a potency of 425 γ/mg. (E. coli).

Although certain specific examples have been disclosed herein for purposes of illustration, it will be evident to those skilled in the art that the invention is capable of various other modifications and adaptations within the scope of the appended claims.

The step of precipitating an insoluble streptomycin salt from the alcoholic solution of streptomycin hydrohalide by adding to such alcoholic solution certain amine salts, such triethylamine sulfate, is covered by the claims in our copending application Serial No. 65,734, filed December 16, 1948.

The invention claimed is:

1. Method of recovering streptomycin hydrochloride from a salt selected from the group consisting of streptomycin silicotungstate and streptomycin phosphomolybdate which comprises subjecting said salt to metathesis in a solution of methanol and triethylamine hydrochloride to form an insoluble triethylamine salt and an alcoholic solution of streptomycin hydrochloride.

2. Method of recovering streptomycin hydrochloride from streptomycin silicotungstate which comprises dissolving the latter in a 1-1 mixture of acetone and water, and adding thereto a solution of methanol and triethylamine hydrochloride to form insoluble triethylamine silicotungstate and a solution of streptomycin hydrochloride.

3. Method of recovering streptomycin hydrochloride from an aqueous solution of streptomycin which comprises reacting said solution with a member selected from the group consisting of silicotungstic acid and phosphomolybdic acid, and subjecting the resulting complex streptomycin precipitate to metathesis in a solution of methanol and triethylamine hydrochloride to form an insoluble triethylamine salt and an alcoholic solution of streptomycin hydrochloride.

4. Method of recovering streptomycin hydrochloride from an aqueous solution of streptomycin which comprises reacting said solution with silicotungstic acid, dissolving the resulting streptomycin silicotungstate in a 1-1 mixture of acetone and water, and adding thereto a methanol solution containing 10% triethylamine hydrochloride to form insoluble triethylamine silicotungstate and an alcoholic solution of streptomycin hydrochloride.

5. Method of recovering a streptomycin hydrohalide from a salt selected from the group consisting of streptomycin silicotungstate and streptomycin phosphomolybdate which comprises subjecting said salt to metathesis in an alcoholic solution of a triethylamine hydrohalide to form an insoluble triethylamine salt and an alcoholic solution of a streptomycin hydrohalide.

6. Method of recovering a streptomycin hydrohalide from an aqueous solution of streptomycin which comprises reacting said solution with a member selected from the group consisting of silicotungstic acid and phosphomolybdic acid, and subjecting the resulting complex streptomycin precipitate to metathesis in an alcoholic solution of a triethylamine hydrohalide to form an insoluble triethylamine salt and an alcoholic solution of a streptomycin hydrohalide.

7. A method of recovering a streptomycin hydrohalide from a salt selected from the group consisting of streptomycin silicotungstate and streptomycin phosphomolybdate, which comprises subjecting said salt to metathesis with an amine hydrohalide selected from the group consisting of the hydrohalides of triethylamine, dimethylaniline, diethylaniline, ethylene diamine, hexamethylene tetramine, quinoline, pyridine, ethanolamine and monoethylamine, in a lower alkanol to form an insoluble amine salt and an alcoholic solution of a streptomycin hydrohalide.

8. A method of recovering a streptomycin hydrohalide from an aqueous solution of streptomycin, which comprises reacting said solution with a member selected from the group consisting of silicotungstic acid and phosphomolybdic acid, and subjecting the resulting complex streptomycin precipitate to metathesis with an amine hydrohalide of the group consisting of the hydrohalides of triethylamine, dimethylaniline, diethylaniline, ethylene diamine, hexamethylene tetramine, quinoline, pyridine, ethanolamine, and monoethylamine, in a lower alkanol to form an insoluble amine salt and an alcoholic solution of a streptomycin hydrohalide.

PETER P. REGNA.
ISAIAH A. SOLOMONS.

REFERENCES CITED

The following references are of record in the file of this patent:

UNITED STATES PATENTS

| Number | Name | Date |
|---|---|---|
| 2,501,014 | Wintersteiner et al. | Mar. 21, 1950 |

OTHER REFERENCES

Carter et al., J. Biol. Chem., v. 160 (1945), pp. 338–339, 2 pages

Chem. Abs., vol. 13, page 215 (1919).

Proc. Soc. Exp. Biol. Med., vol. 55, pp. 66–69 (1944)

J. A. C. S., vol. 68, pp. 772–776 (May 1946).